(12) United States Patent
Siilats

(10) Patent No.: US 11,767,099 B1
(45) Date of Patent: Sep. 26, 2023

(54) SEPARABLE CONTROL OF AN AIRCRAFT

(71) Applicant: Bytelogics Inc., New York, NY (US)

(72) Inventor: Keith Siilats, New York, NY (US)

(73) Assignee: BYTELOGICS INC., New York, NY (US)

( * ) Notice: Subject to any disclaimer, the term of this patent is extended or adjusted under 35 U.S.C. 154(b) by 0 days.

(21) Appl. No.: 18/092,366

(22) Filed: Jan. 2, 2023

(51) Int. Cl.
  *B64C 13/04* (2006.01)
  *B64C 13/18* (2006.01)
  *B64C 39/02* (2023.01)

(52) U.S. Cl.
  CPC .......... *B64C 13/0423* (2018.01); *B64C 13/18* (2013.01); *B64C 39/024* (2013.01)

(58) Field of Classification Search
  CPC .... B64C 13/0423; B64C 13/18; B64C 39/024
  See application file for complete search history.

(56) References Cited

U.S. PATENT DOCUMENTS

| 9,352,824 | B2 * | 5/2016 | Piotrowski | .............. B64C 13/12 |
| 2005/0080495 | A1 * | 4/2005 | Tessier | .................. B64C 13/503 |
| | | | | 700/63 |
| 2019/0321981 | A1 * | 10/2019 | Bosworth | .................. B25J 9/04 |

FOREIGN PATENT DOCUMENTS

CN   207575604 U  *  7/2018

OTHER PUBLICATIONS

O'Donnell ("Your Plastic Co-Pilot Who's Fun to Fly With?—A Robotic Arm That Can Help Pilots on Aircrafts"), Evolving Science, Nov. 7, 2017 (Year: 2017).*
Kadir et al. ("Internet Controlled Robotic Arm "), 2012, SciVerse ScienceDirect, International Symposium on Robotics and Intelligent Sensors 2012 (IRIS 2012), pp. 1065-1071 (Year: 2012).*
Stephen James, Pieter Abbeel, Coarse-to-fine Q-attention with Tree Expansion, arxiv:2204.12471v2 [cs,RO], May 2, 2022, https://arxiv.org/pdf/2204.12471.pdf.

* cited by examiner

*Primary Examiner* — James M McPherson
*Assistant Examiner* — Kyle J Kingsland
(74) *Attorney, Agent, or Firm* — Levine's Tech Consulting LLC; Frank E. Levine

(57) ABSTRACT

An approach is disclosed for directing an aircraft. A first yoke is connected to a second yoke by a connection element where a first input force applied to the first yoke is added to a second input force applied to the second yoke to form a resulting force and where the resulting force is applied to an aircraft control surface used for directing the aircraft. When a difference between the first input force and the second input force exceeds a predetermined value, the second yoke is disconnect preventing the second input force from contributing to the resulting force.

20 Claims, 5 Drawing Sheets

Aircraft embodiment for control configuration cockpit view 200

Aircraft control configuration 100

Yoke 1 110                                    Yoke 2 120

Pilot 1 130                                   Pilot 2 140

SEPARABLE CONTROL OF AN AIRCRAFT

BACKGROUND

The present invention relates to controlling an aircraft, more specifically a separable control.

SUMMARY

According to an embodiment of the present invention, there is a method for controlling an aircraft. A first yoke is connected to a second yoke by a connection element wherein a first input force applied to the first yoke is added to a second input force applied to the second yoke to form a resulting force and wherein the resulting force is applied to an aircraft control surface used for controlling the aircraft, When a difference between the first input force and the second input force exceeds a predetermined value, the second yoke is disconnect preventing the second input force from contributing to the resulting force.

According to one embodiment of the invention, there is provided system for controlling an aircraft utilizing the method for controlling an aircraft.

According to one embodiment of the invention, there is provided a computing program product executing instructions on at least one processor including a local storage device accessible by the processor having the steps of the method for controlling an aircraft.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
FIG. 1 depicts a schematic view an aircraft control configuration.
Figure 1:
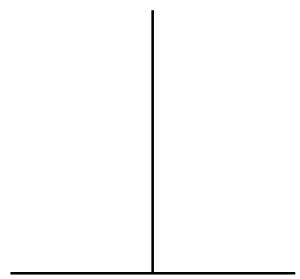
Figure 1:
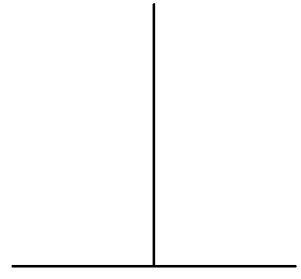
Figure 1:
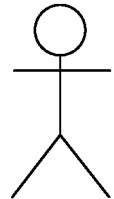
Figure 1:
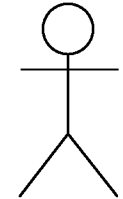

There are many systems that support dual controls. One familiar system is found in cars used for training new drivers. A student may sit in a primary driver position and instructor may sit in a typically passenger position. In this situation, there are times when the instructor needs to assume control and overrides the control inputs from the passenger. Other system with dual controls may be for situations where many lives may be affected when one person can affect the lives of many others. One example is access to nuclear weapons. Two separate people must agree to turn a key at about the same time to enable the access to nuclear weapons. Passenger aircrafts provide another example where dual controls are often provided. There are many situations where two pilots are required, for example, by regulations, to operate a aircraft. Along with the need to provide redundancy, there is also a need for reduced costs. One of the cases for reduced cost is where the second pilot is less qualified than the captain. In some smaller business jets, the installed autopilot can act as the copilot requiring only one pilot. However, the current designs of aircraft only allow the autopilot to do limited tasks. There is an opportunity to maintain safety and allow for remote access for a human second in command to be available remotely over internet and by using a remotely controlled robot arm.

Currently, mission critical redundancies with two separate control stations require two humans at the location to have access to each control separately and do not support remote access.

In order to overcome the deficiencies of the prior art, a method, a system, and a product is provided to facilitate utilization of dual controls with only one person at the location. In an embodiment, the dual controls are configured to allow a first input to a first control to be combined with a second input from a second control to control a aircraft. In an embodiment, the dual controls are connected. In a scenario where the one person at the location becomes incapacitated, it is desirable to support a remote-control access allowing a remote pilot to operate the aircraft. In an embodiment, a pre-programmed and trained robot arm is provided that is capable of reaching circuit brakers, radios, throttles, gears, and flaps on both pilot stations and autopilot. In an embodiment, the robot arm does not grip the yokes or throttles directly, instead one or more tab(s), referred to hereafter as a connection element(s) is installed on the controls and throttles that the robot arm grips. In an embodiment, the connection element is breakable by under 10 pounds of force by a human. This force depends on the position where the robot arm grabs the tab. Different positions are calibrated for different breaking forces. This support allows for two distinct modes of operation for the robot arm. In one mode there is a real emergency, and robot arm needs to do whatever it takes to land the plane, since the human copilot is incapacitated. In that case the robot wants to grab hold of the tab at a point that does not break easily in a real emergency, the robot would grab a tab in a way that it won't break easily, allowing the robot to execute more aggressive moves. In practice the system needs to be developed and tested. During testing the captain or remote pilot monitors the plane and the remote robot arm operation. In the testing mode, used for training and testing, where the human copilot is alive and well and is monitoring the arm, it is very important to quickly disconnect the arm if something goes wrong in operating the arm. Quickly disconnecting the arm when there is a problem detected during testing and/or training, facilitates allowing the human to take over operations and addresses the concern of improper usage of the arm during testing and training.

The robot arm is preprogrammed to reach all circuit brakers, yoke, radios and is capable of execute a circuit breaker reset in under 1 second. The robot arm could engage the existing autopilot and control it under emergency conditions. Another safety feature includes an emergency stop button for the robot arm. System support includes communication features enabling video streams with support, for example, but not limited to (1) Over the shoulder 3D camera looking inside cockpit. (2) Web camera and laptop facing copilot. (3) High definition forward facing camera. (4) Two-way radio connection allowing transmit and receive by remote pilot. Instead of the aircraft, the robot arm could control a truck, where the tab is installed on the primary steering wheel and the robot arm grabs hold of the tab, instead of the wheel. In this case again, the system can be developed and tested while the human is monitoring the arm inside the truck. The arm can then be used as a lane assist method in addition to emergency control.

In an embodiment, movements can be recorded by moving the robot arm and played back with sufficient accuracy to repeat the action, such as, but not limited to engage autopilot, change frequency, reset circuit breaker (CB), and the like. A user interface may be provided to and from a 3D camera allowing the user to control the robot arm while looking inside cockpit. The testing may occur in a simulator environment or in a real aircraft. There is also a specialized support and testing module for the Landing Mode. For example, in the Normal Mode, if there is a loss of data connection to the remote pilot, and the main pilot is incapacitated, the robot arm will circle over a predetermined point until data connection is re-established. In the Landing Mode, the robot needs to autonomously complete the landing, as the position of the plane is too low to enter a circle. This is accomplished by the computer pre-calculating a landing sequence, before entering the Landing Mode, and presenting the landing sequence to the remote pilot for approval. This landing sequence could be for example a 20 second forward-looking set of actions. If the remote pilot approves the landing sequence, the robot arm will enter landing mode and will follow the sequence if the data connection is lost. The sequence is fine-tuned by pilot during the transition phase between the final approach and the touchdown on the landing surface (flare) but results in successful landing even if the network is down. The robot arm can use convex optimization such as that supported by CVX to calculate the path. The landing sequence path may be mapped in 3D to a remote operator based on altitude and speed. Up to 3 robot arms may be required based on testing on different models (throttles, yoke, rudders) where the throttle and rudder robot arms have fewer degrees of freedom. In addition, pedal attachment may be used with easily removable attachment poles to pedals allowing left right and up movement for brakes.

The test procedures may first start out with utilizing models of the cockpit and robot arm in a virtual environment and test controllability of an aircraft simulator. Second step is controlling the actual robot arm in a real simulator cockpit, making sure robot arm can perform all tasks with a remote pilot. Various network delays are introduced up to 200 ms (Starlink®[1] worst case) and failover to Long-Term Evolution (LTE) cellphone network at low altitudes. Similar to Zipline, a circling procedure is established at each destination airport where robot arm autonomously directs the plane to circle over a given point upon pilot in command (PIC) incapacitation. Each circle is tested in flight for sufficient LTE network coverage. Remote pilot sitting in the back of the plane may be trained to fly the plane over a local area network (LAN) inside the aircraft. Tests may be conducted for firefighting.

In addition, public is served as the flights and cockpits are recorded, test data is gathered allowing future operations in more complex aircraft, especially in high-risk situations such as firefighting, where loss of pilot life can be halved by having a single pilot plus robot arm system.

FIG. 1 provides a schematic view of a passenger aircraft control configuration 100. In this configuration, yoke 1 110 is controlled by pilot 1 130. Yoke 2 120 is controlled by pilot 2 140. The passenger aircraft is controlled by an input 1 to the yoke 1 110 by pilot 1 130 combined with an input 2 to yoke 2 120 by pilot 2 140.

Figure 2:
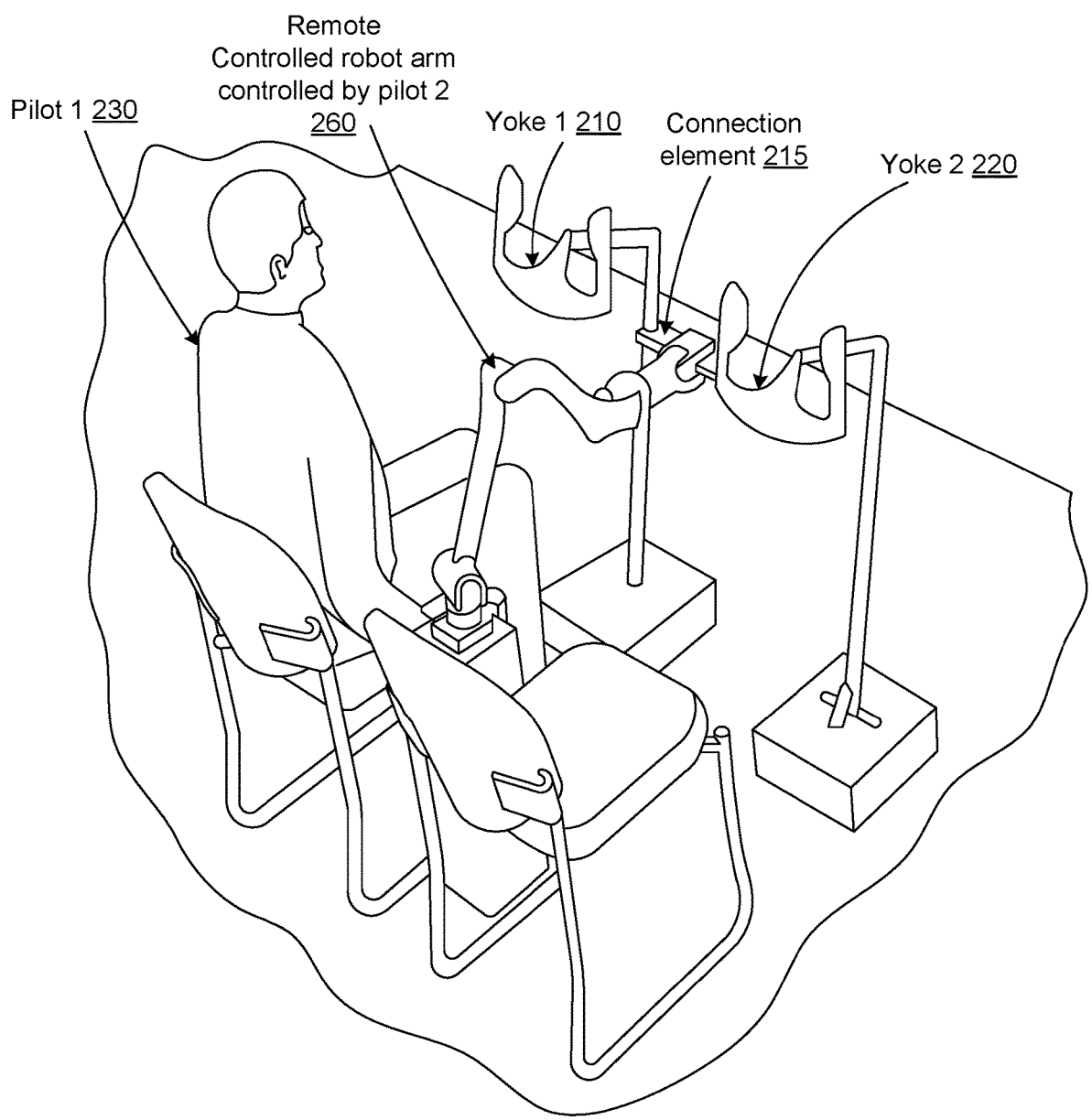
FIG. 2 depicts a high-level view of an embodiment of an aircraft control configuration cockpit view.

FIG. 2 provides a schematic view of an embodiment of the invention with a passenger aircraft control configuration replacement cockpit view 200. In this configuration pilot 1 230 controls yoke 1 210 which is operatively connected via a connection element 215 to yoke 2 220, A robot arm may control yoke 2 220. The aircraft is controlled by an input 1 to yoke 1 210 by pilot 1 130 combined with an input 2 to yoke 2 220 by the robot arm. In an embodiment the robot arm is remote controlled by pilot 2 260. In one embodiment, the robot arm does not directly control either yoke 1 210 or yoke 2 220, but instead controls the connection element 215 which is configured to control yoke 2 230. The robot arm may directly control yoke 2 220 which could be in a direction opposed to yoke 1 210. If the force exceeds a predetermined limit established by the connection element 215, the connection element 215 breaks due to the difference in force applied to yoke 1 210 and the force applied to yoke 2 220. Once the extension is broken, control of the aircraft is controlled by connection to an aircraft control surface. In an embodiment, Yoke 1 210 may be designated as primary and control the aircraft. Alternatively, input from either Yoke may be used to control the aircraft. That is, the airline control system may not distinguish between input from Yoke 1 210 and input from Yoke 2 220 and support combining the inputs from Yoke 1 210 and the inputs from Yoke 2 220.

Figure 3:
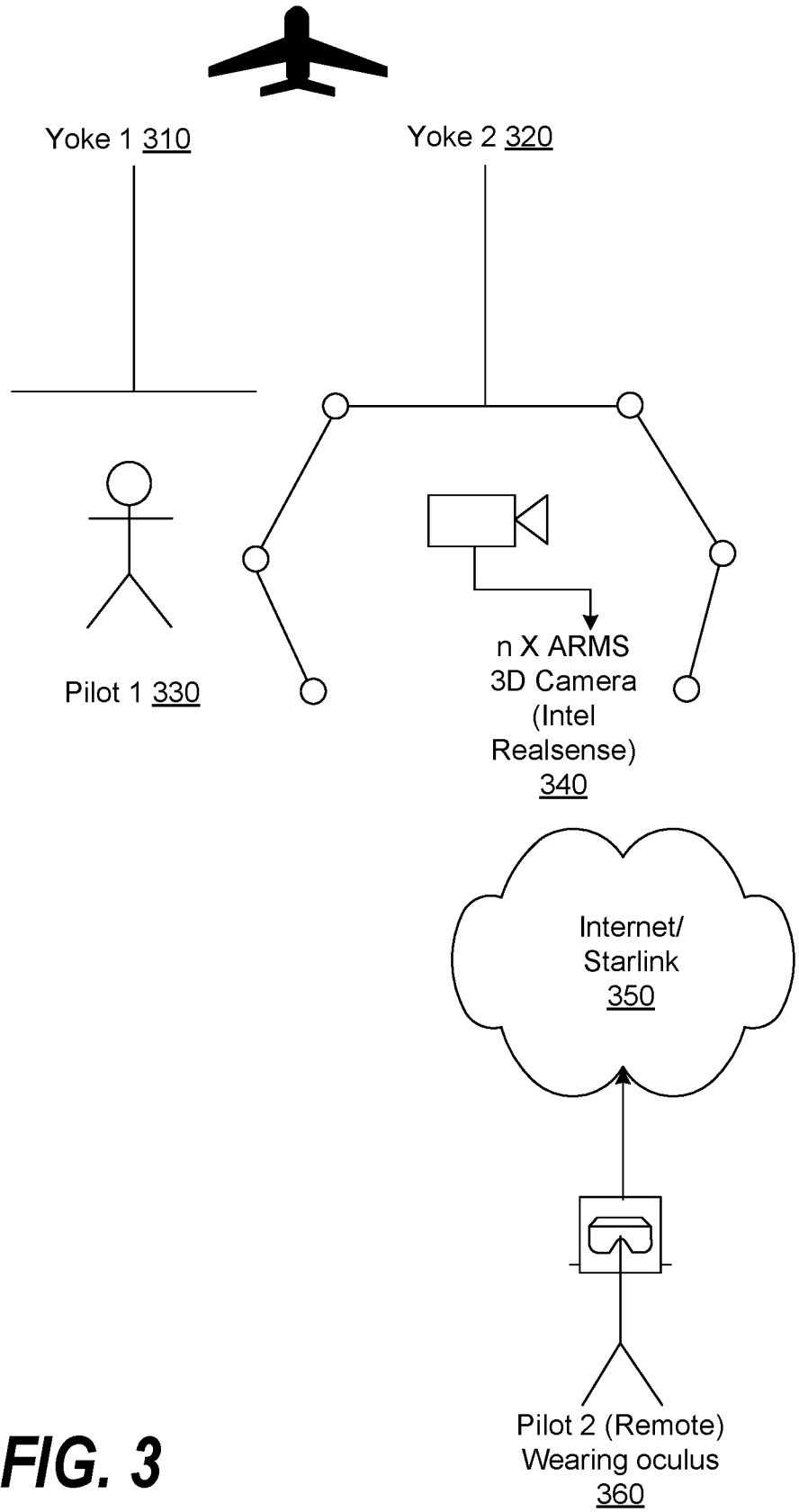
FIG. 3 depicts a schematic view of an embodiment of an aircraft control configuration system.

FIG. 3 depicts a schematic system view of an aircraft control configuration replacement system 300. Yoke 1 310 is controlled by pilot 1 330. Yoke 2 320 is controlled by a number of robot arms which are remote controlled via pilot 2 wearing an oculus 360. The number of robot arms is determined by the characteristics of the aircraft. A 3D camera broadcasts cockpit images 340 via an internet. A Starlink 350 connection may be used where the remote pilot sends controls to the robot arms.

Figure 4:
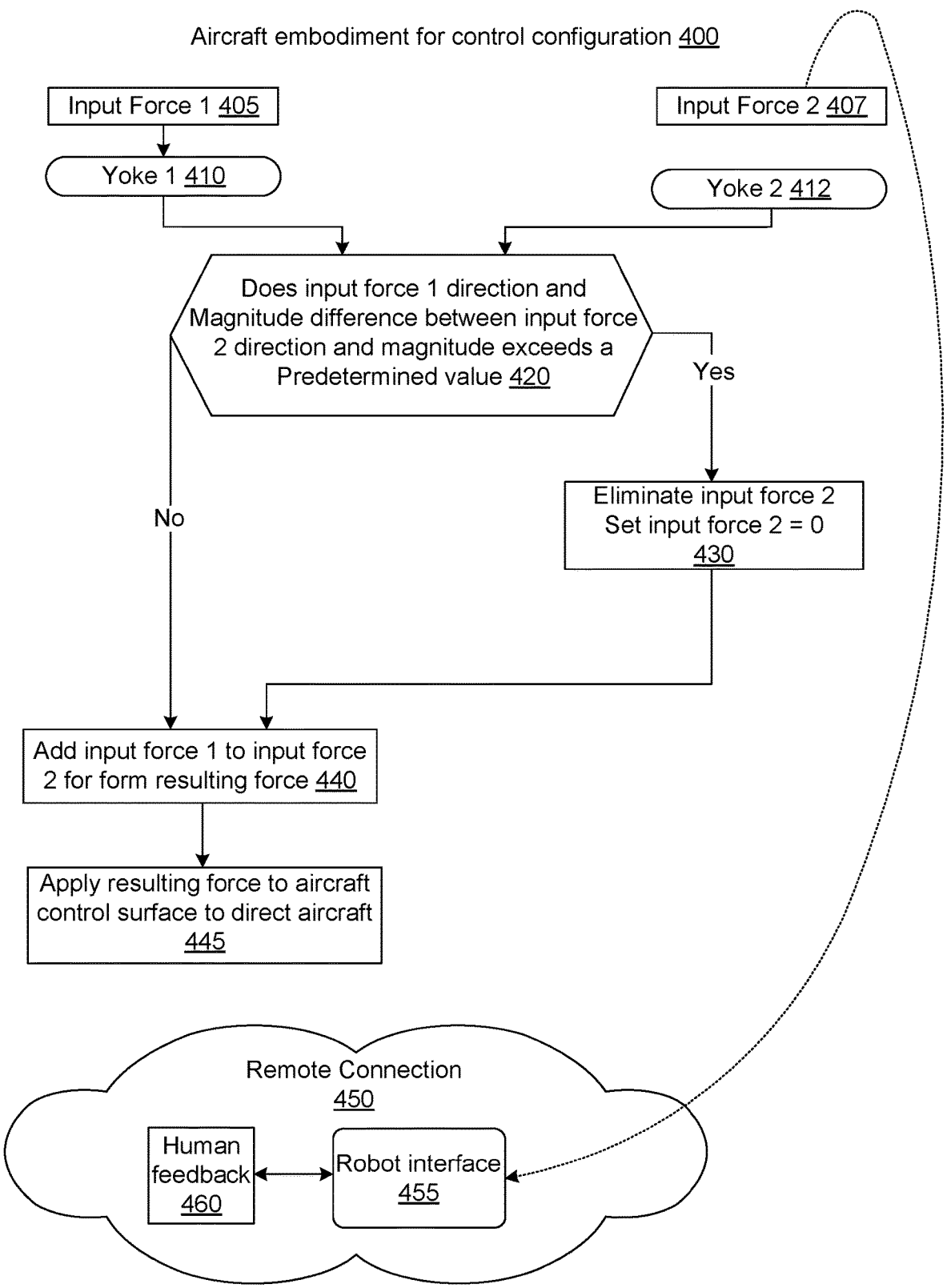
FIG. 4 depicts a schematic view of an embodiment of a aircraft control configuration system.

FIG. 4 depicts a process flow of control in an embodiment of control configuration 400. At step 405, an input force 1 is applied to yoke 1 410. At step 407, input force 2 is applied to yoke 2 412. The process determines as to whether input force 1 direction and magnitude difference between input force 2 direction and magnitude exceeds a predetermined value (decision 420). If input force 1 direction and magnitude difference between input force 2 direction and magnitude exceeds a predetermined value, then decision 420 branches to the 'Yes' branch. On the other hand, if input force 1 direction and magnitude difference between input force 2 direction and magnitude does not exceed the predetermined value, then decision 420 branches to the 'No' branch. At step 435, the process eliminates input force 2 by setting input force 2=0. At step 440, the process adds input force 1 to input force 2 to form a resulting force. At step 445, the process applies resulting force to aircraft control surface to direct aircraft. At step 450, the process utilizes remote connection where human remote viewing is utilized to provide human feedback 460 to a robot interface 455 which controls input force 2 407. In an embodiment, information representing the positioning of each yoke may be transmitted to the aircraft control surface and usage of the information may be determined by a combination of software and hardware. In an embodiment, a slider may be used to allocate contribution between different yokes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as separable control of an aircraft 550. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Figure 5:
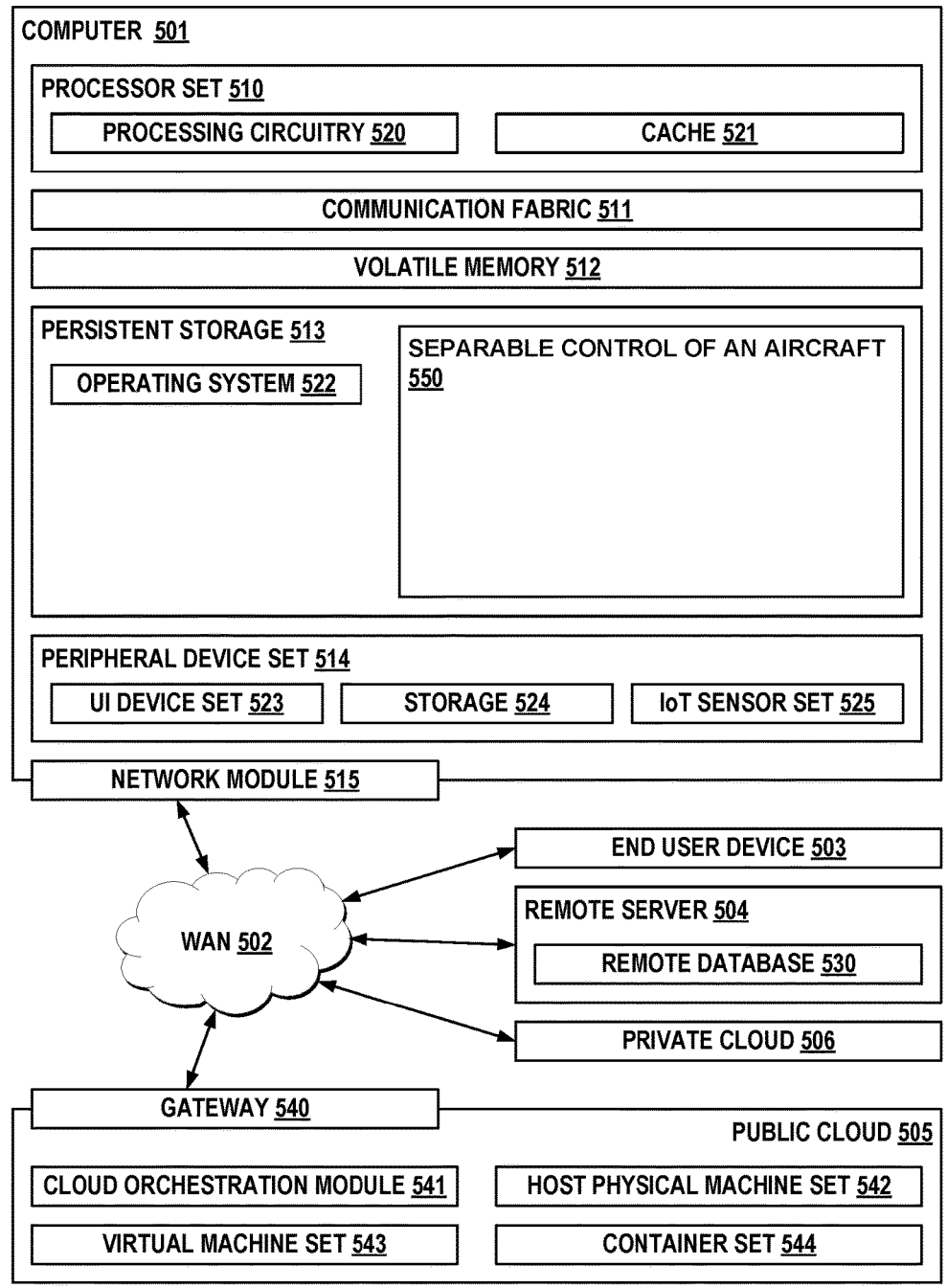
FIG. 5 depicts a schematic view of a processing system wherein the methods of this invention may be implemented.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A method for controlling an aircraft comprising:
    applying a first input force from a first human pilot to a first yoke wherein the first yoke is physically connected to a second yoke and wherein the first yoke is connected to a control surface of the aircraft and wherein the second yoke is connected to the control surface of the aircraft;
    transmitting images of a cockpit of the aircraft via internet to a virtual reality (VR) headset;
    receiving the images of the cockpit by the VR headset wherein the VR headset is worn by a second human pilot;
    receiving from the second human pilot, via an internet connection, a control command directed to a robot positioned in the cockpit based on the received images;
    attaching the robot to a breakable link connected to the second yoke;
    applying the received control command as a second input force link through the breakable link to the second yoke;
    breaking the breakable link based on a difference of the first input force and the second input force meeting a variable threshold;
    preventing applying the second input force to the control surface of the aircraft when the breakable link is broken; and
    applying the first input force combined with the second input force to the control surface of the aircraft when the breakable link is not broken.

2. The method of claim 1, wherein the variable threshold is determined based on a position of applying a force on the breakable link.

3. The method of claim 1, further comprising:
    providing a plurality of modes of operation of the aircraft wherein the plurality of modes of operation of the aircraft is selected from a group consisting of a testing mode, an operational mode, an emergency mode, a non-emergency mode, and a landing mode.

4. The method of claim 3, further comprising:
    training the robot to use the breakable link and to adjust the position of applying force according to a mode of operation in the plurality of modes of operation.

5. The method of claim 4, wherein in the testing mode the robot grabs the connection element at a position allowing the first human pilot to break the connection element with under 10 pounds of force.

6. The method of claim 3, wherein in the emergency mode the robot grabs the connection element at a position preventing the first human pilot from breaking the connection element with under 10 pounds of force.

7. The method of claim 3, further comprising:
    utilizing a machine learning algorithm to calculate a landing path; and
    utilizing the calculated landing path when the internet connection is not available.

8. The method of claim 3, wherein the robot is trained to allow for utilizing direct access to control elements in the emergency mode and the landing mode.

9. The method of claim 8, wherein the control elements comprise:
    circuit brakers, radios, throttles, gears, and flaps on both pilot stations and an autopilot of the aircraft.

10. An information handling system for controlling an aircraft comprising:
    one or more processors;
    a memory coupled to at least one of the processors;
    a network interface that connects the local node to one or more remote nodes; and
    a set of computer program instructions stored in the memory and executed by at least one of the processors in order to perform actions comprising:
        applying a first input force from a first human pilot to a first yoke wherein the first yoke is physically connected a second yoke and wherein the first yoke is connected to a control surface of the aircraft and wherein the second yoke is connected to the control surface of the aircraft;
        transmitting images of a cockpit of the aircraft via internet to a virtual reality (VR) headset;
        receiving the images of the cockpit by the VR headset wherein the VR headset is worn by a second human pilot;
        receiving from the second human pilot, via an internet connection, a control command directed to a robot positioned in the cockpit based on the received images;
        attaching the robot to a breakable link connected to the second yoke;
        applying the received control command as a second input force link through the breakable link to the second yoke;
        breaking the breakable link based on a difference of the first input force and the second input force meeting a variable threshold;

preventing applying the second input force to the control surface of the aircraft when the breakable link is broken; and applying the first input force combined with the second input force to the control surface of the aircraft when the breakable link is not broken.

11. The information handling system of claim 10, wherein the variable threshold is determined based on a position of applying a force on the breakable link.

12. The information handling system of claim 10, further comprising:

providing a plurality of modes of operation of the aircraft wherein the plurality of modes of operation of the aircraft is selected from a group consisting of a testing mode, an operational mode, an emergency mode, a non-emergency mode, and a landing mode.

13. The information handling system of claim 12, further comprising:

training the robot to use the breakable link and to adjust the position of applying force according to a mode of operation in the plurality of modes of operation.

14. The information handling system of claim 13, wherein in the testing mode the robot grabs the connection element at a position allowing the first human pilot to break the connection element with under 10 pounds of force.

15. A computer program product for controlling an aircraft stored in a computer readable storage medium, comprising computer program code that, when executed by an information handling system, performs actions comprising:

applying a first input force from a first human pilot to a first yoke wherein the first yoke is physically connected a second yoke and wherein the first yoke is connected to a control surface of the aircraft and wherein the second yoke is connected to the control surface of the aircraft;

transmitting images of a cockpit of the aircraft via internet to a virtual reality (VR) headset;

receiving the images of the cockpit by the VR headset wherein the VR headset is worn by a second human pilot;

receiving from the second human pilot, via an internet connection, a control command directed to a robot positioned in the cockpit based on the received images;

attaching the robot to a breakable link connected to the second yoke;

applying the received control command as a second input force link through the breakable link to the second yoke;

breaking the breakable link based on a difference of the first input force and the second input force meeting a variable threshold;

preventing applying the second input force to the control surface of the aircraft when the breakable link is broken; and applying the first input force combined with the second input force to the control surface of the aircraft when the breakable link is not broken.

16. The computer program product of claim 15, wherein the variable threshold is determined based on a position of applying a force on the breakable link.

17. The computer program product of claim 15, further comprising:

providing a plurality of modes of operation of the aircraft wherein the plurality of modes of operation of the aircraft is selected from a group consisting of a testing mode, an operational mode, an emergency mode, a non-emergency mode, and a landing mode.

18. The computer program product of claim 17, further comprising:

training the robot to use the breakable link and to adjust the position of applying force according to a mode of operation in the plurality of modes of operation.

19. The computer program product of claim 18, wherein in the testing mode the robot grabs the connection element at a position allowing the first human pilot to break the connection element with under 10 pounds of force.

20. The computer program product of claim 18, wherein in the emergency mode the robot grabs the connection element at a position preventing the first human pilot from breaking the connection element with under 10 pounds of force.

* * * * *